US009501343B2

(12) United States Patent
Kim

(10) Patent No.: US 9,501,343 B2
(45) Date of Patent: Nov. 22, 2016

(54) METHOD OF OPERATING NON-VOLATILE MEMORY DEVICE

(71) Applicant: SAMSUNG ELECTRONICS CO., LTD., Suwon-Si, Gyeonggi-Do (KR)

(72) Inventor: Kyung-Ryun Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 30 days.

(21) Appl. No.: 14/697,381

(22) Filed: Apr. 27, 2015

(65) Prior Publication Data
US 2016/0034327 A1 Feb. 4, 2016

(30) Foreign Application Priority Data

Aug. 1, 2014 (KR) ........................ 10-2014-0099195

(51) Int. Cl.
*G06F 11/00* (2006.01)
*G06F 11/07* (2006.01)
*G11C 16/10* (2006.01)

(52) U.S. Cl.
CPC ........... *G06F 11/076* (2013.01); *G06F 11/073* (2013.01); *G11C 16/10* (2013.01)

(58) Field of Classification Search
USPC ................................................. 714/6.1, 6.11
See application file for complete search history.

(56) References Cited

U.S. PATENT DOCUMENTS

| 5,365,486 | A | 11/1994 | Schreck |
| 6,879,520 | B2 | 4/2005 | Hosono et al. |
| 7,477,547 | B2 | 1/2009 | Lin |
| 7,499,320 | B2 | 3/2009 | Li |
| 7,567,455 | B2 | 7/2009 | Khaef |
| 7,808,831 | B2 | 10/2010 | Mokhlesi et al. |
| 8,665,647 | B2 | 3/2014 | Lee et al. |
| 2004/0225918 | A1* | 11/2004 | Fruhauf et al. ...... G06K 7/0008 714/30 |
| 2008/0126843 | A1* | 5/2008 | Nygren et al. ...... G06F 13/1668 714/6.2 |
| 2010/0268996 | A1* | 10/2010 | Yang ................... G11B 19/048 714/47.1 |
| 2011/0157993 | A1 | 6/2011 | Kim |
| 2013/0064013 | A1 | 3/2013 | Lee et al. |
| 2014/0129872 | A1* | 5/2014 | Bueb et al. ......... G06F 11/1012 714/2 |
| 2014/0223246 | A1 | 8/2014 | Kim et al. |

* cited by examiner

*Primary Examiner* — Sarai Butler
(74) *Attorney, Agent, or Firm* — Volentine & Whitt, PLLC

(57) ABSTRACT

A method of operating a non-volatile memory device including first buffer memory cells and main memory cells, where the first buffer memory cells store first data, the main memory cells store second data, which is read from the first buffer memory cells, or recovered first data, which is recovered from the second data through a correction process, includes reading data, which is stored in sample buffer memory cells included in the first buffer memory cells, as sample data when an accumulated number of read commands, which are executed on the non-volatile memory device, reaches a reference value. The method includes counting the number of errors included in the sample data based an error correction code, and determining whether the main memory cells store the second data or the recovered first data based on the number of the errors relative to the first threshold value.

20 Claims, 15 Drawing Sheets

| DETERME THAT THE MAIN MEMORY CELLS STORE THE RECOVERED FIRST DATA WHEN THE NUMBER OF THE ERRORS IS BIGGER THAN A SECOND THRESHOLD VALUE | ~S131 |

| DETERMINE THAT THE MAIN MEMORY CELLS STORE THE SECOND DATA WHEN THE NUMBER OF THE ERRORS IS EQUAL TO OR SMALLER THAN THE SECOND THRESHOLD VALUE | ~S132 |

DETERMINE THAT THE MAIN MEMORY CELLS STORE THE RECOVERED FIRST DATA WHEN THE RATIO OF THE ON-CELLS IS SMALLER THAN A SECOND THRESHOLD VALUE —S221

DETERMINE THAT THE MAIN MEMORY CELLS STORE THE SECOND DATA WHEN THE RATIO OF THE ON-CELLS IS EQUAL TO OR BIGGER THAN THE SECOND THRESHOLD VALUE —S222

METHOD OF OPERATING NON-VOLATILE MEMORY DEVICE

CROSS-REFERENCE TO RELATED APPLICATION

This U.S. Non-provisional application claims priority under 35 USC §119 to Korean Patent Application No. 10-2014-0099195, filed on Aug. 1, 2014, in the Korean Intellectual Property Office (KIPO), the disclosure of which is incorporated by reference in its entirety herein.

BACKGROUND

1. Technical Field

Example embodiments relate generally to a non-volatile memory device, and more particularly to a method of operating a non-volatile memory device to increase reliability.

2. Discussion of the Related Art

The individual memory cells in a non-volatile memory device, such as a flash memory device, may store data in accordance with a plurality of threshold voltage distributions, where each respective threshold voltage distribution is assigned to a corresponding logic state for stored data. In the non-volatile memory device, if, after a portion of blocks are programmed, read operations for the programmed blocks are repeatedly performed, a threshold voltage distribution of other blocks in an erased state may be undesirably shifted or broadened due to a read disturbance or a threshold voltage distribution of blocks adjacent to the programmed block may be undesirably shifted or broadened due to the read disturbance.

A non-volatile memory device using an on-chip buffered programming (OBP) method includes buffer memory cells including a single-level cell (SLC), which stores a data bit, and main memory cells including a multi-level cell (MLC), which stores two data bits, or a triple-level cell (TLC), which stores three data bits. The OBP method stores input data in the buffer memory cells, and transfers the stored data of the buffer memory cells to the normal memory cells. In this case, reliability of the buffer memory cells may be decreased by read disturbances due to a lot of data input/output commands on the buffer memory cells.

SUMMARY

At least one example embodiment of the inventive concept provides a method of operating a non-volatile memory device increasing reliability of a buffer memory cells included in the non-volatile memory device using an on-chip buffered program (OBP) method.

According to example embodiments, a method of operating a non-volatile memory device including first buffer memory cells and main memory cells, where the first buffer memory cells store a first data, the main memory cells store a second data, which is read from the first buffer memory cells, or a recovered first data, which is recovered from the second data through a correction process or procedure, includes reading a data, which is stored in sample buffer memory cells included in the first buffer memory cells, as a sample data when an accumulated number of read commands, which are executed on the non-volatile memory device, reaches a reference value, counting the number of errors included in the sample data based an error correction code, and determining whether the main memory cells store the second data or the recovered first data based on the number of the errors relative to a first threshold value, e.g. when the number of the errors is equal to or smaller than the first threshold value.

In an example embodiment, the method may further include determining that second buffer memory cells included in the non-volatile memory device store the recovered first data when the number of the errors is greater than the first threshold value.

In an example embodiment, a memory controller may generate the read commands, and determine the reference value as a random number.

In an example embodiment, the accumulated number may be reset after determining whether the main memory cells store the second data or the recovered first data based on the number of the errors when the number of the errors is equal to or less than the first threshold value.

In an example embodiment, the accumulated number may be reset after determining that the second buffer memory cells included in the non-volatile memory device store the recovered first data when the number of the errors is greater than the first threshold value.

In an example embodiment, a first wordline connected to the sample buffer memory cells may be adjacent to a second wordline corresponding to a frequent read command among the read commands.

In an example embodiment, the sample buffer memory cells may execute an erase operation before reading the data, which is stored in the sample buffer memory cells included in the first buffer memory cells, as the sample data when the accumulated number of the read commands, which are executed on the non-volatile memory device, reaches the reference value.

In an example embodiment, determining whether the main memory cells store the second data or the recovered first data based on the number of the errors when the number of the errors is equal to or smaller than the first threshold value may include determining that the main memory cells store the recovered first data when the number of the errors is greater than a second threshold value.

In an example embodiment, determining whether the main memory cells store the second data or the recovered first data based on the number of the errors when the number of the errors is equal to or less than the first threshold value may further include determining that the main memory cells store the second data when the number of the errors is equal to or less than the second threshold value.

In an example embodiment, each of the first buffer memory cells may be a single-level cell storing a data bit, and each of the main memory cells may be a multi-level cell storing two data bits.

In an example embodiment, each of the first buffer memory cells may be a single-level cell storing a data bit, and each of the main memory cells may be a triple-level cell storing three data bits.

In an example embodiment, a memory controller may generate the recovered first data from the second data based on the error correction code.

According to example embodiments, a method of operating a non-volatile memory device including first buffer memory cells and main memory cells, where the first buffer memory cells store a first data, the main memory cells store a second data, which is read from the first buffer memory cells, or a recovered first data, which is recovered from the second data through a correction process, includes applying a verification read voltage to a first word line connected to sample buffer memory cells included in the first buffer memory cells and measuring a ratio of on-cells, which have a lower threshold voltage than the verification read voltage, among the sample buffer memory cells when an accumulated number of read commands, which are executed on the non-volatile memory device, reaches a reference value, and determining whether the main memory cells store the second data or the recovered first data based on the ratio of the on-cells relative to a first threshold value, e.g. when the ratio of the on-cells is equal to or greater than the first threshold value.

In an example embodiment, the method may further include determining that second buffer memory cells included in the non-volatile memory device store the recovered first data when the ratio of the on-cells is less than the first threshold value.

In an example embodiment, each of the first buffer memory cells may have a first logic state corresponding to logic value 0 or a second logic state corresponding to logic value 1. The verification read voltage may be between a first threshold voltage distribution corresponding to the first logic state and a second threshold voltage distribution corresponding to the second logic state.

In an example embodiment, a memory controller may generate the read commands, and determine the reference value as a random value.

In an example embodiment, a first wordline connected to the sample buffer memory cells may be adjacent to a second wordline corresponding to a frequent read command among the read commands.

In an example embodiment, the sample buffer memory cells may execute an erase operation before applying the verification read voltage to the first word line connected to the sample buffer memory cells included in the first buffer memory cells and measuring the ratio of the on-cells, which have a lower threshold voltage than the verification read voltage, among the sample buffer memory cells when the accumulated number of the read commands, which are executed on the non-volatile memory device, reaches the reference value.

In an example embodiment, determining whether the main memory cells store the second data or the recovered first data based on the ratio of the on-cells when the ratio of the on-cells is equal to or greater than the first threshold value may include determining that the main memory cells store the recovered first data when the ratio of the on-cells is less than a second threshold value.

In an example embodiment, determining whether the main memory cells store the second data or the recovered first data based on the ratio of the on-cells when the ratio of the on-cells is equal to or greater than the first threshold value may further include determining that the main memory cells store the second data when the ratio of the on-cells is equal to or greater than the second threshold value.

As described above, a method of operating a non-volatile memory device may increase reliability of the non-volatile memory device by selecting sample buffer memory cells among buffer memory cells effected by read disturbances at a random time, measuring reliability of the sample buffer memory cells, and determining whether an error correction procedure is performed to data read from the buffer memory cells or not based on the reliability when the data is transferred to main memory cells according to an on-chip buffered programming (OBP) method.

BRIEF DESCRIPTION OF THE DRAWINGS

Example embodiments of the inventive concept will be more clearly understood from the following detailed description taken in conjunction with the accompanying drawings.

FIG. 2 is a flow chart illustrating a determination of whether the main memory cells store the second data or the recovered first data based on the number of the errors when the number of the errors is equal to or less than the first threshold value of the flow chart of FIG. 1.

FIG. 13 is a flow chart illustrating a determination of whether the main memory cells store the second data or the recovered first data based on the ratio of the on-cells when the ratio of the on-cells is equal to or greater than the first threshold value of the flow chart of FIG. 12.

DETAILED DESCRIPTION OF THE EMBODIMENTS

Figure 1:
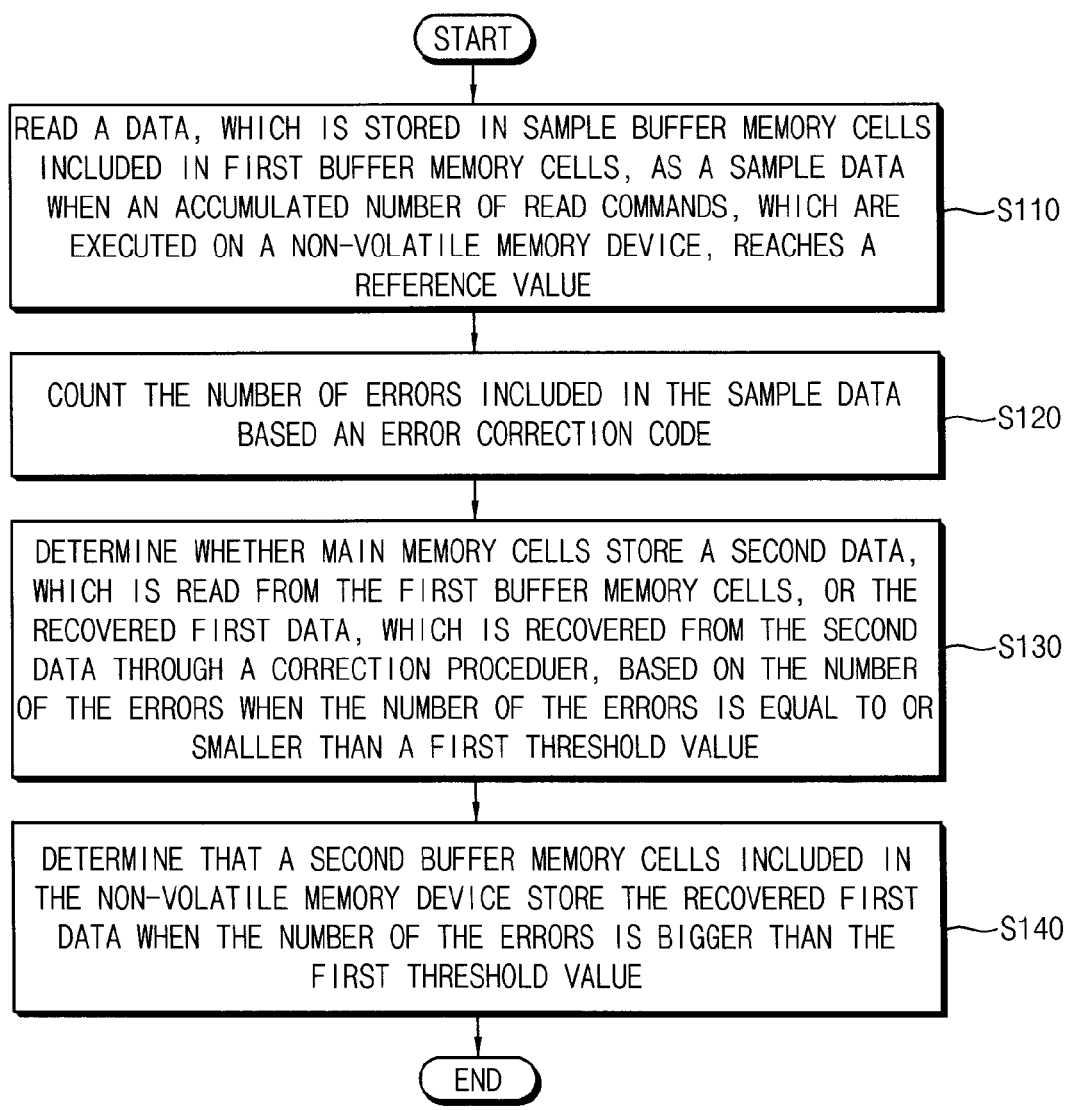
FIG. 1 is a flow chart illustrating a method of operating a non-volatile memory device according to an example embodiment.

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a flow chart illustrating a method of operating a non-volatile memory device according to an example embodiment.

Referring to FIG. 1, a non-volatile memory device includes a buffer memory cell array and a main memory cell array. The buffer memory cell array includes first buffer memory cells. The main memory cell array includes main memory cells. The first buffer memory cells store a first data. The main memory cells store a second data, which is read from the first buffer memory cells, or a recovered first data, which is recovered from the second data through a correction procedure.

A method of operating the non-volatile memory device according to an example embodiment includes reading a data, which is stored in sample buffer memory cells included in the first buffer memory cells, as a sample data when an accumulated number of read commands, which are executed on the non-volatile memory device, reaches a reference value (S110). It may take a long time to measure the reliability of all parts of the first buffer memory cells. To save time, hereinafter, the reliability of the sample buffer memory cells will be measured in the following steps. The step (S110) will be further described with the reference to FIG. 11.

The method further includes counting the number of errors included in the sample data based on an error correction code (S120). The reliability of the sample buffer memory cells may be determined based on the number of the errors included in the sample data. In an example embodiment, the reliability of the sample buffer memory cells may be inversely proportional to the number of the errors included in the sample data. Counting the number of the errors included in the sample data based on the error correction code (S120) may be executed on a memory controller connected to the non-volatile memory device. The memory controller may determine whether the sample data includes uncorrectable errors or not based on parity bits included in the sample data, and may determine the number of errors included in the sample data.

The method further includes determining whether the main memory cells store the second data or the recovered first data based on the number of the errors when the number of the errors is equal to or less than a first threshold value (S130). The step (S130) will be described with the reference to FIG. 2.

The method may further includes determining that a second buffer memory cells included in the non-volatile memory device store the recovered first data when the number of the errors is greater than the first threshold value (S140). In this case, the sample buffer memory cells are determined to be unreliable because the number of the errors due to the read disturbance is large. Therefore, the data stored in the first buffer memory cells should be recovered through the correction procedure, and the recovered data should be stored in the second buffer memory cells, and the first buffer memory cells may be disabled. Generation of the read disturbance will be described with the references to FIGS. 7 through 11.

FIG. 2 is a flow chart illustrating a determination of whether the main memory cells store the second data or the recovered first data based on the number of the errors when the number of the errors is equal to or less than the first threshold value of the flow chart of FIG. 1.

Referring to FIG. 2, determining whether the main memory cells store the second data or the recovered first data based on the number of the errors when the number of the errors is equal to or less than the first threshold value (S130) may include determining that the main memory cells store the recovered first data when the number of the errors is greater than a second threshold value (S131), and determining that the main memory cells store the second data when the number of the errors is equal to or less than the second threshold value (S132).

In a case that the number of the errors is greater than the second threshold value and the number of the errors is equal to or less than the first threshold value (S131), the sample buffer memory cells are determined to be reliable after error correction because the number of the errors due to the read disturbance is small. In this case, while the data stored in the first buffer memory cells is transferred to the main memory cells in the on-chip buffered programming (OBP) method, the error correction performed to the second data, which is read from the first buffer memory cells, and the recovered first data, which is recovered from the second data, is stored to the main memory cells.

In a case that the number of the errors is equal to or less than the second threshold value (S132), the sample buffer memory cells are determined to be reliable because the number of the errors due to the read disturbance is few. In this case, while the data stored in the first buffer memory cells is transferred to the main memory cells in OBP method, the second data, which is read from the first buffer memory cells, is stored to the main memory cells. The steps (S131 and S132) will be described with the reference to FIG. 6.

Figure 3:
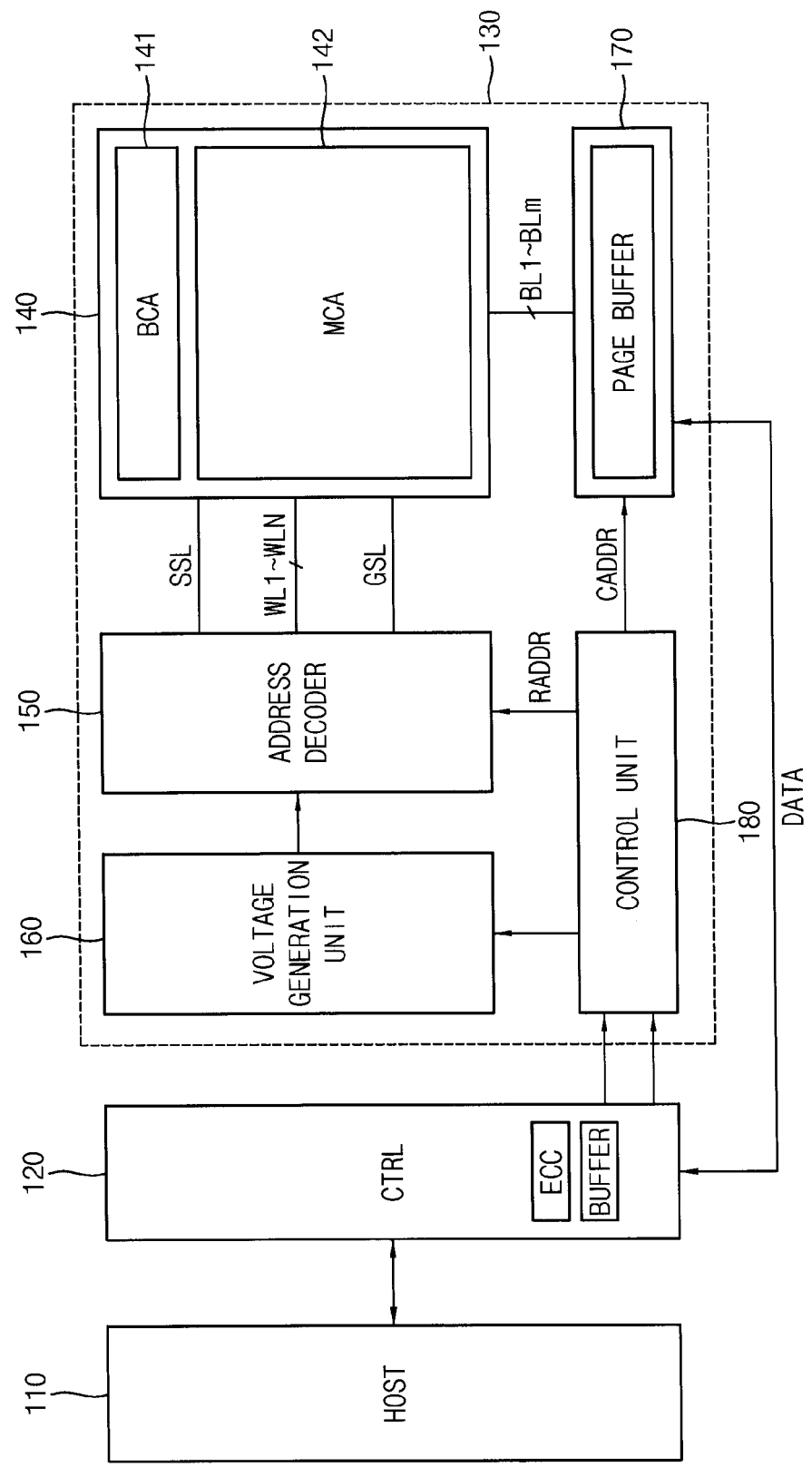
FIG. 3. is a block diagram illustrating a memory system including a non-volatile memory device according to an example embodiment.

FIG. 3 is a block diagram illustrating a memory system including a non-volatile memory device according to an example embodiment. Referring to FIG. 3, a memory system 100 includes a host 110, a memory controller 120, and a non-volatile memory device 130. The memory controller 120 includes an error corrector ECC and a buffer memory BUFFER. The non-volatile memory device 130 includes a memory cell array 140, a control circuit 180, a voltage generation circuit 160, an address decoder 150, and a data input/output circuit 170. The memory cell array 140 includes a buffer memory cell array BCA 141 and a main memory cell array MCA 142. The data input/output circuit 170 includes a page buffer PAGE BUFFER.

The buffer memory cell array 141 may include the first buffer memory cells and the second buffer memory cells of the flow chart of FIG. 1. The main memory cell array 142 may include the main memory cells of the flow chart of FIG. 1.

In an example embodiment, each of the first buffer memory cells included in the buffer memory cell array 141 may be a single-level cell storing a data bit, and each of the main memory cells included in the main memory cell array 142 may be a multi-level cell storing two data bits. In another example embodiment, each of the first buffer memory cells included in the buffer memory cell array 141 may be a single-level cell storing a data bit, and each of the main memory cells included in the main memory cell array 142 may be a triple-level cell storing three data bits. In still another example embodiment, each of the first buffer memory cells included in the buffer memory cell array 141 may be a multi-level cell storing two data bits, and each of the main memory cells included in the main memory cell array 142 may be a triple-level cell storing three data bits.

The memory controller 120 may generate a command signal CMD and an address signal ADDR based on communication between the host 110. The control circuit 180 may generate a row address signal RADDR and a column address signal CADDR based on the command signal CMD and the address signal ADDR. The voltage generation circuit 160 may generate a read voltage based on a voltage control signal. The address decoder 150 may apply the read voltage to a wordline corresponding to the row address signal RADDR when the command signal is a read command signal. The data input/output circuit 170 receives a read data DATA from the buffer memory cells or the main memory cells connected to the wordline through a plurality of bit lines BL1 through BLM in response to the column address signal CADDR.

The memory cell array 140 may be implemented with a two-dimensional structure or a three-dimensional structure. The three-dimensional embodiment of the memory cell array 140 will be described with the reference to FIG. 4.

The on-chip buffered programming (OBP) may include a first programming operation and a second programming operation. In the first programming operation, when a first data, which has a unit program size of the buffer memory cell array 141, is stored to the buffer memory BUFFER, the memory controller 120 reads the first data from the buffer memory BUFFER, and stores the first data to the buffer memory cells included in the buffer memory cell array 141.

In the second programming operation, when a second data, which has the unit program size of the main memory cell array 142, is stored to the buffer memory cell array 141, the memory controller 120 reads the second data from the buffer memory cells array 141, and stores the second data to the main memory cells included in the main memory cell array 142.

This present embodiments determine whether the error correction is performed or not during the second programming operation based on the reliability of the sample buffer memory cells included in the buffer memory cell array 141.

The on-chip buffered programming (OBP) method according to example embodiment will be described with the reference to FIG. 6.

In addition, in an embodiment of the present disclosure, the memory cell array 140 may be implemented as a three dimensional (3D) memory array. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array. The following patent documents, which are hereby incorporated by reference, describe suitable configurations for the 3D memory arrays, in which the three-dimensional memory array is configured as a plurality of levels, with word-lines and/or bit-lines shared between levels: U.S. Pat. Nos. 7,679,133; 8,553,466; 8,654,587; 8,559,235; and US Pat. Pub. No. 2011/0233648.

Figure 4:
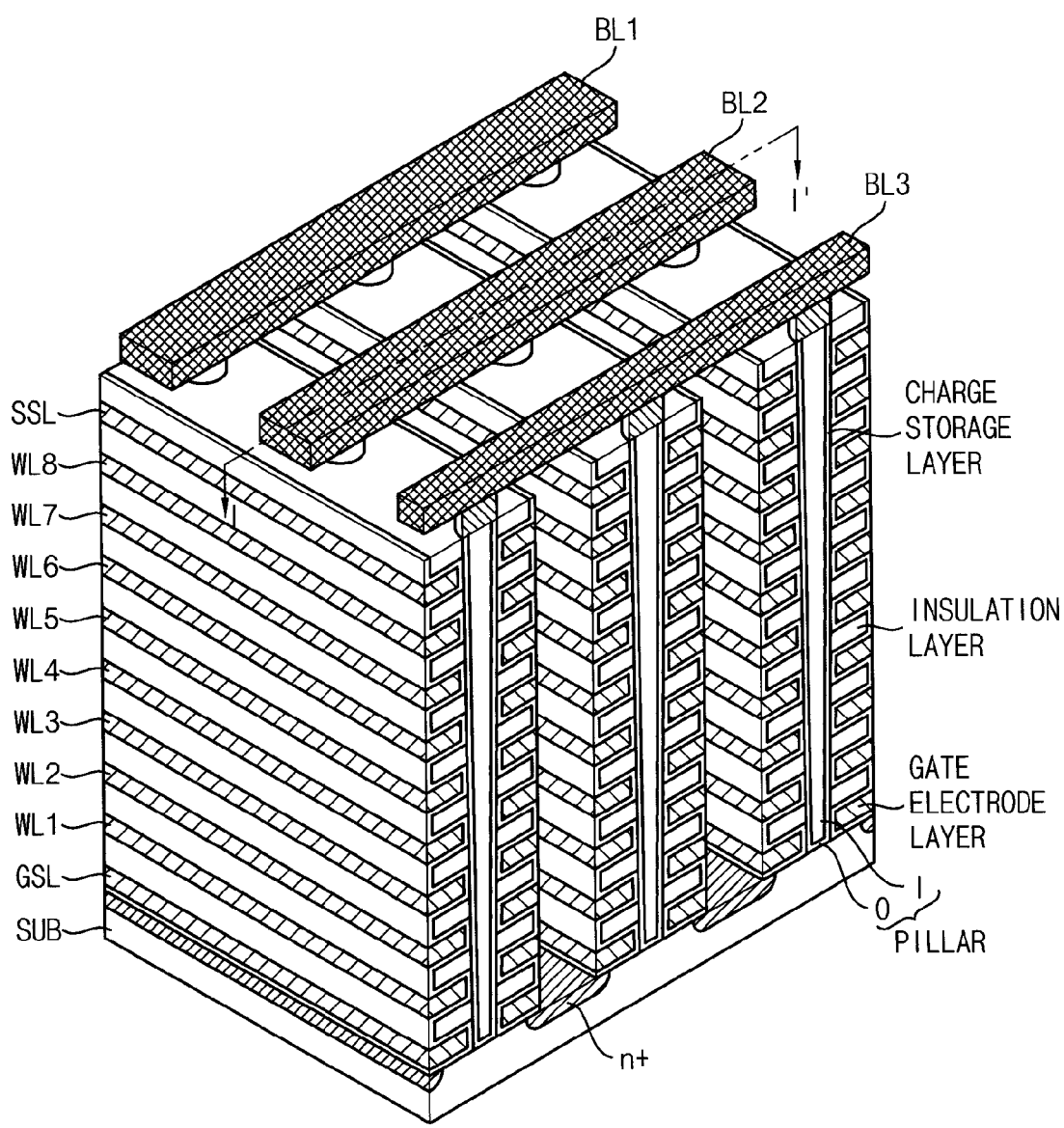
FIG. 4 is a perspective view illustrating a three-dimensional embodiment of the memory cell array included in the memory system of FIG. 3.

FIG. 4 is a perspective view illustrating a three-dimensional embodiment of the memory cell array included in the memory system of FIG. 3. Referring to FIG. 4, a portion of the memory cell array 140a may be the buffer memory cell array 141, and remaining portion of the memory cell array 140a may be the main memory cell array 142.

The memory cell array 140a may be formed in a direction perpendicular to a substrate SUB. An n+ doped region may be formed in the substrate SUB. A gate electrode layer and an insulation layer may be alternately deposited on the substrate SUB. Also, a charge storage layer may be formed between the gate electrode layer and the insulation layer.

When the gate electrode layer and the insulation layer are vertically patterned, a V-shaped pillar may be formed. The pillar may penetrate the gate electrode layer and the insulation layer to be connected to the substrate SUB. The outer portion O of the pillar may be configured with a channel semiconductor, and the inner portion I of the pillar may be configured with an insulation material such as silicon oxide.

Referring again to FIG. 4, the gate electrode layer may be connected to the ground selection line GSL, the plurality of word lines WL1 to WL8, and the string selection line SSL. The pillar may be connected to the plurality of bit lines BL1 to BL3. It is illustrated in FIG. 4, that the memory cell array 140a has the ground selection line GSL, the string selection line SSL, eight wordlines WL1 to WL8, and three bit lines BL1 to BL3 as an example, but embodiments are not limited thereto.

Figure 5:
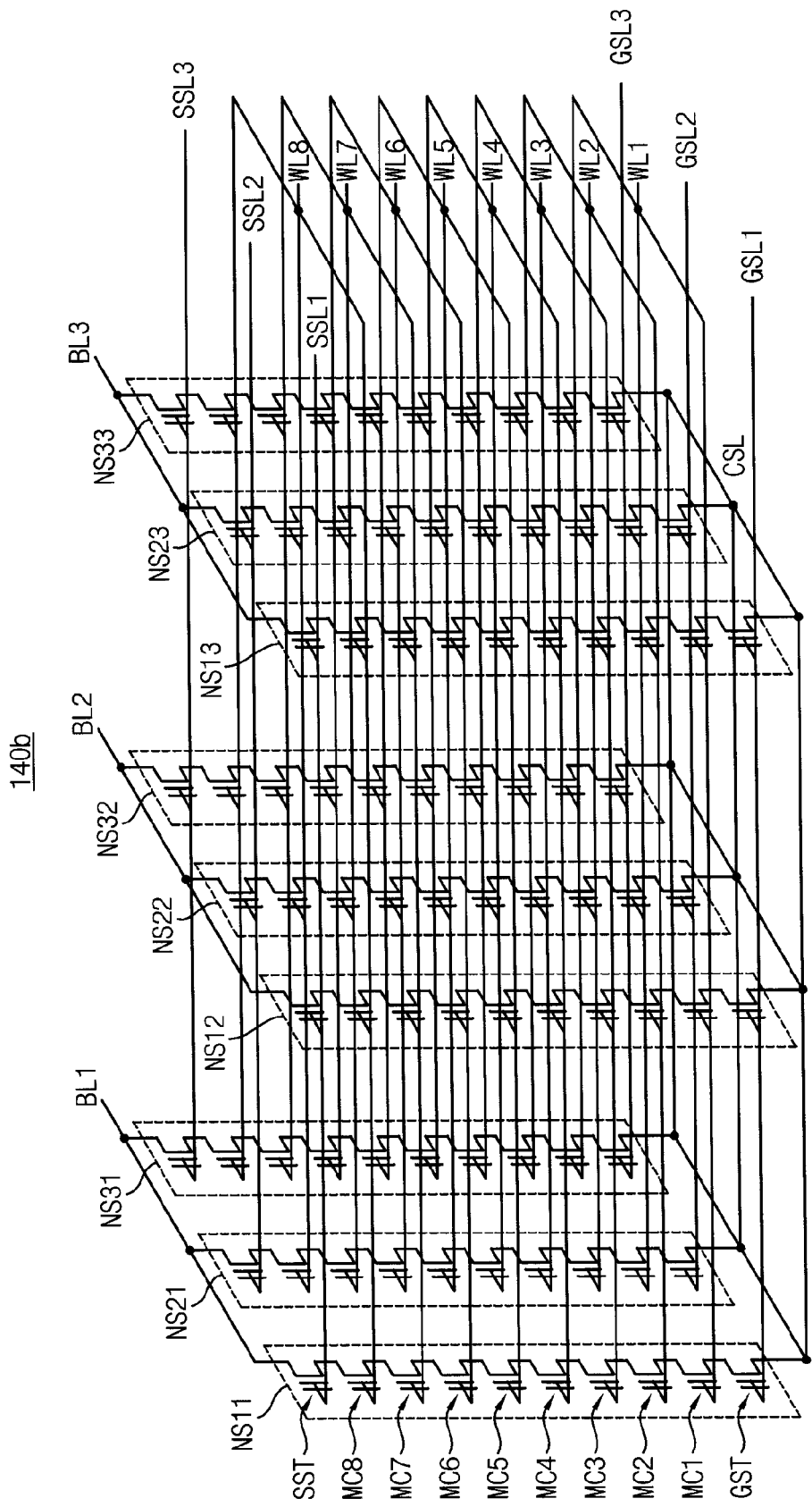
FIG. 5 is an equivalent circuit illustrating the memory cell array of the memory cell array of FIG. 4.

FIG. 5 is an equivalent circuit illustrating the memory cell array of the memory cell array of FIG. 4. Referring to FIG. 5, NAND strings NS11 to NS33 may be connected between the bit lines BL1 to BL3 and a common source line CSL. Each NAND string (e.g., NS11) may include a string selection transistor SST, a plurality of memory cells MC1 to MC8, and a ground selection transistor GST.

The string selection transistor SST may be connected to string selection lines SSL1 to SSL3. The plurality of memory cells MC1 to MC8 may be connected to corresponding word lines WL1 to WL8, respectively. The ground selection transistor GST may be connected to ground selection lines GSL1 to GSL3. The string selection transistor SST may be connected to the bit lines BL1 to BL3, and the ground selection transistor GST may be connected to the common source line CSL.

Referring again to FIG. 5, wordlines (e.g., WL1) having the same height may be commonly connected and the ground selection lines GSL1 to GSL3 and the string selection lines SSL1 to SSL3 may be separated. For example, when a physical page that includes memory cells connected to the first word line WL1 and included in the NAND strings NS11, NS12, and NS13 is programmed, the first word line WL1, the first string selection lines SSL1, and the first ground selection line GSL1 may be selected.

Figure 6:
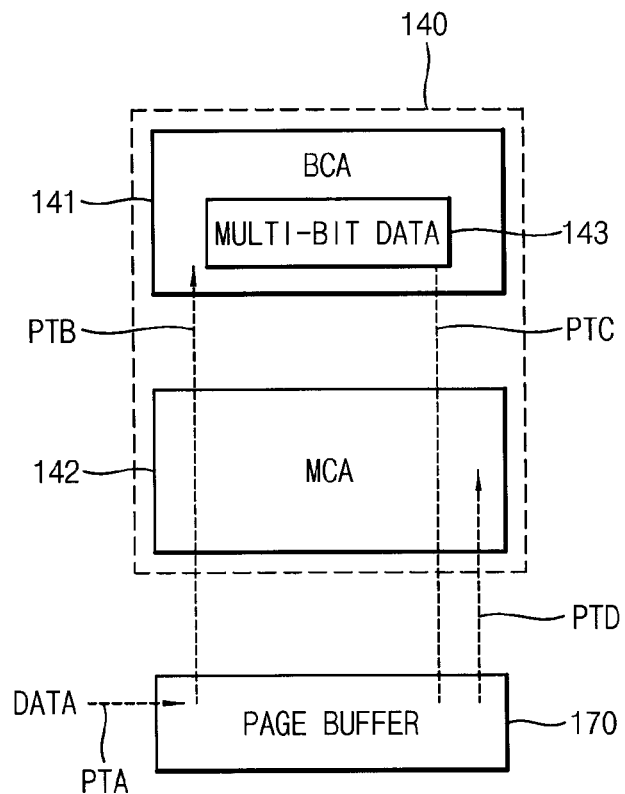
FIG. 6 is a block diagram illustrating on-chip buffered (OBP) programming procedure in the non-volatile memory device included in the memory system of FIG. 3.

FIG. 6 is a block diagram illustrating an on-chip buffered (OBP) programming procedure in the non-volatile memory device included in the memory system of FIG. 3. In FIG. 6, the memory cell array 140 includes the buffer memory cell array 141 and the main memory cell array 142. The buffer memory cell array 141 may include a plurality of buffer memory cells. The main memory cell array 142 may include a plurality of main memory cells.

The buffer memory cell array 141 may include multi-bit data 143 from the outside. When each of the buffer memory cells included in the buffer memory cell array 141 is a single-level cell, the buffer memory cell array 141 may operate in high speed, and may be produced as a low cell density circuit. On the contrary, when each of the main memory cells is a multi-level cell or triple-level cell, the main memory cell array 142 may operate in low speed, and may be produced as a high cell density circuit.

In the on-chip buffered programming (OBP), when the page data DATA, which has the unit program size, is input from the outside, the page data DATA is loaded PTA to page buffers included in the page buffer 170, and then is loaded PTB to the buffer memory cells included in the buffer memory cell array 141 again. The unit program size may be set according to required conditions (e.g. program type, number of bits in a cell). The loading operations PTA, PTB may correspond to the first program operation included in the on-chip buffered programming (OBP) method described with the reference to FIG. 3.

When the page data DATA is loaded to the buffer memory cells included in the buffer memory cell array 141, the page data DATA loaded to the buffer memory cells is loaded PTC to page buffers included in the page buffer 170, and then is loaded PTD to the main memory cells included in the main memory cell array 142. In this case, unit program size of the page buffer 170 and the main memory cell array 142 may be greater than unit program size of the buffer memory cell array 141. The loading operations PTC, PTD may correspond to the second operation included in the on-chip buffered programming (OBP) method described with the reference to FIG. 3.

When the number of the errors is greater than the second threshold value and the number of the errors is equal to or less than the first threshold value, the main memory cells store the recovered first data (S131). In this case, errors of the page data loaded to the page buffer 170 may be corrected through the error corrector ECC included in the memory controller 120 of FIG. 3 after executing the loading operations PTA, PTB, and PTC of the on-chip buffered programming (OBP). Then, the corrected page data may be loaded PTD to the main memory cells included in the main memory cell array 142.

When the number of the errors is equal to or less than the second threshold value, the main memory cells store the second data (S132). In this case, the page data loaded to the page buffer 170 may be loaded PTD to the main memory cells included in the main memory cell array 142 after executing the loading operations PTA, PTB, and PTC of the on-chip buffered programming (OBP).

Figure 7:
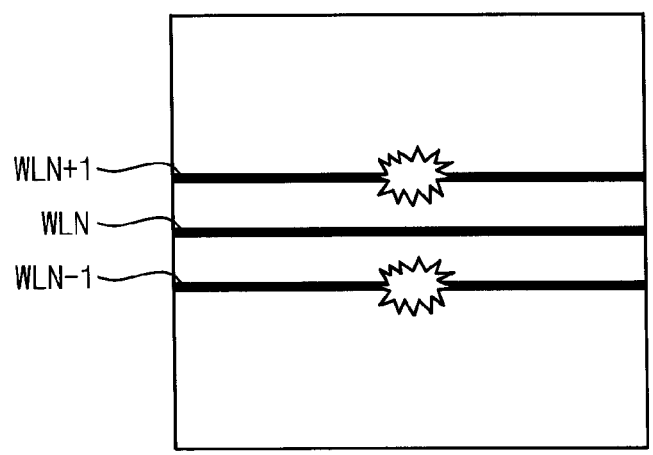
FIG. 7 is a diagram illustrating a wordline affected by the read disturbance generated in the buffer memory cell array included in the memory system of FIG. 3.

FIG. 7 is a diagram illustrating a wordline affected by the read disturbance generated in the buffer memory cell array included in the memory system of FIG. 3. Referring to FIG. 7, the buffer memory cell array 141a may include a (N)-th wordline WLN, a (N−1)-th wordline WLN−1, and a (N+1)-th wordline WLN+1. The buffer memory cell array 141a may include (N)-th buffer memory cells connected to the (N)-th wordline WLN, (N−1)-th buffer memory cells connected to the (N−1)-th wordline WLN−1, and (N+1)-th buffer memory cells connected to the (N+1)-th wordline WLN+1.

When the read commands corresponding to the (N)-th wordline WLN are executed frequently, the read disturbance may happen easily on the (N+1)-th buffer memory cells connected to the (N+1)-th wordline WLN+1 adjacent to the (N)-th wordline WLN, and the read disturbance may happen easily on the (N−1)-th buffer memory cells connected to the (N−1)-th wordline WLN−1 adjacent to the (N)-th wordline WLN.

When a frequent read command among the read commands received from the memory controller 120 corresponds to the (N)-th wordline WLN, the sample buffer memory cells of the flow chart of FIG. 1 may be the (N−1)-th buffer memory cells or the (N+1)-th buffer memory cells.

Figure 8:
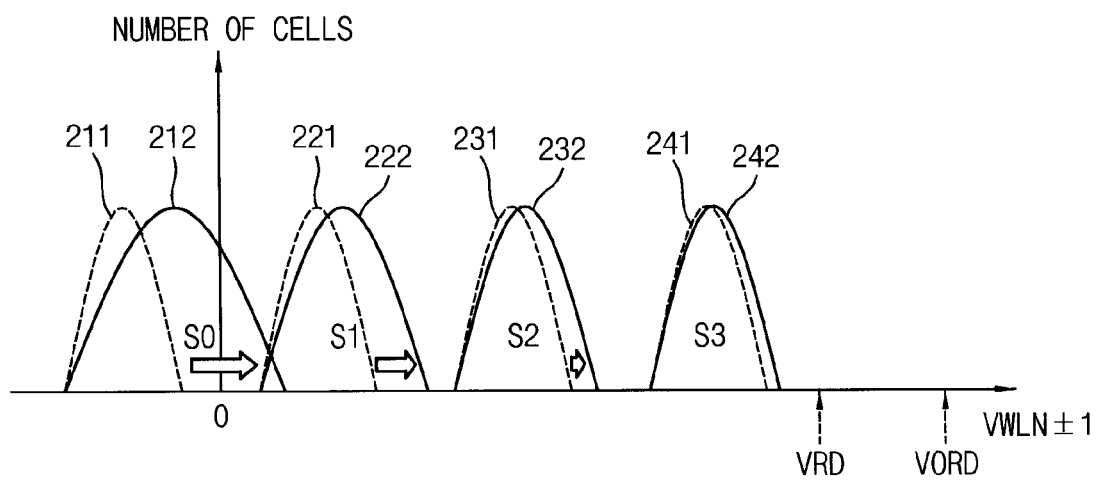
FIG. 8 is a graph illustrating a change on threshold voltage distribution of buffer memory cells connected to the wordline affected by the read disturbance of FIG. 7.

FIG. 8 is a graph illustrating a change on threshold voltage distribution of buffer memory cells connected to the wordline affected by the read disturbance of FIG. 7. Referring to FIG. 8, the first threshold voltage distributions 211, 221, 231, and 241 illustrate the case that the read disturbance does not happen on the (N+1)-th buffer memory cells and the (N−1)-th buffer memory cells.

The (N+1)-th buffer memory cells and the (N−1)-th buffer memory cells may have second threshold voltage distributions 212, 222, 232, and 242 after repeated read commands on the (N)-th buffer memory cells. The second threshold voltage distributions 212, 222, 232, and 242 are spread widely and shifted to right compared to the first threshold voltage distributions 211, 221, 231, and 241. The read error may increase if read commands using read voltages, which are fitted to the first threshold voltage distributions 211, 221, 231, and 241, are executed on the (N+1)-th buffer memory cells and the (N−1)-th buffer memory cells having the second threshold voltage distributions 212, 222, 232, and 242.

Figure 9:
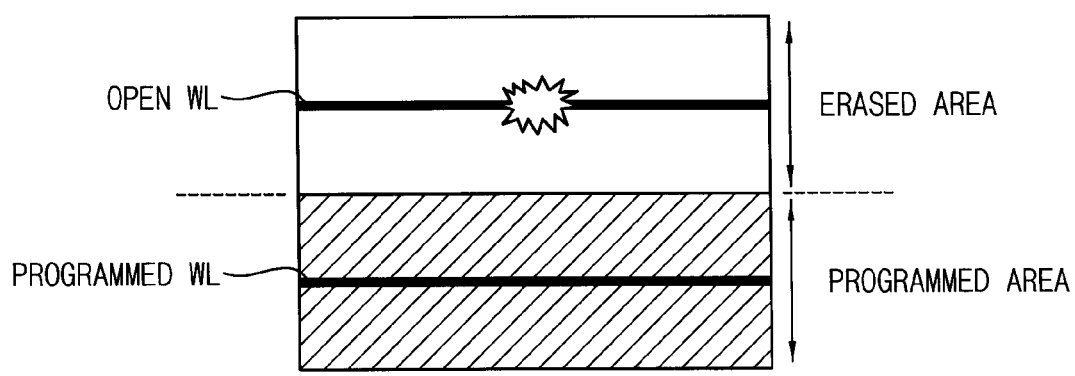
FIG. 9 is a diagram illustrating a wordline affected by the read disturbance generated in the buffer memory cell array included in the memory system of FIG. 3.

FIG. 9 is a diagram illustrating a wordline affected by the read disturbance generated in the buffer memory cell array included in the memory system of FIG. 3. Referring to FIG. 9, the buffer memory cell array 141b includes an erased buffer memory region ERASED AREA, where erase operations are executed, and a programmed buffer memory region PROGRAMMED AREA, where program operations are executed. The erased buffer memory region ERASED AREA includes a first wordline OPEN WL and first buffer memory cells connected to the first wordline OPEN WL. The programmed buffer memory region PROGRAMMED AREA includes a second wordline PROGRAMMED WL and second buffer memory cells connected to the second wordline PROGRAMMED WL.

When the read commands corresponding to the second wordline PROGRAMMED WL are executed frequently, the read disturbance may happen easily on the first buffer memory cells included in the erased buffer memory region ERASED AREA. The sample buffer memory cells of the flow chart of FIG. 1 may be the first buffer memory cells included in the erased buffer memory region ERASED AREA.

Figure 10:
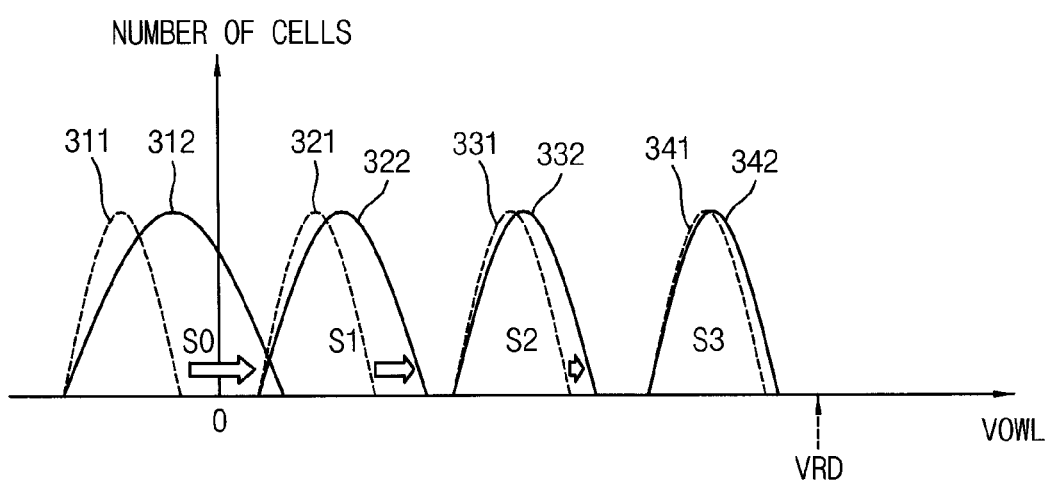
FIG. 10 is a graph illustrating a change on threshold voltage distribution of buffer memory cells connected to the wordline affected by the read disturbance of FIG. 9.

FIG. 10 is a graph illustrating the change on threshold voltage distribution of buffer memory cells connected to the wordline affected by the read disturbance of FIG. 9. Referring to FIG. 10, the first threshold voltage distributions 311, 321, 331, and 341 illustrate the case when the read disturbance does not happen on the first buffer memory cells included in the buffer memory cell array 141*b* of FIG. 9.

The first buffer memory cells may have second threshold voltage distributions 312, 322, 332, and 342 after repeated read commands on the second buffer memory cells. The second threshold voltage distributions 312, 322, 332, and 342 are spread widely and shifted to the right compared to the first threshold voltage distributions 311, 321, 331, and 341. The read error may increase if read commands using read voltages, which are fitted to the first threshold voltage distributions 311, 321, 331, and 341, are executed on the first buffer memory cells having the second threshold voltage distributions 312, 322, 332, and 342.

Figure 11:
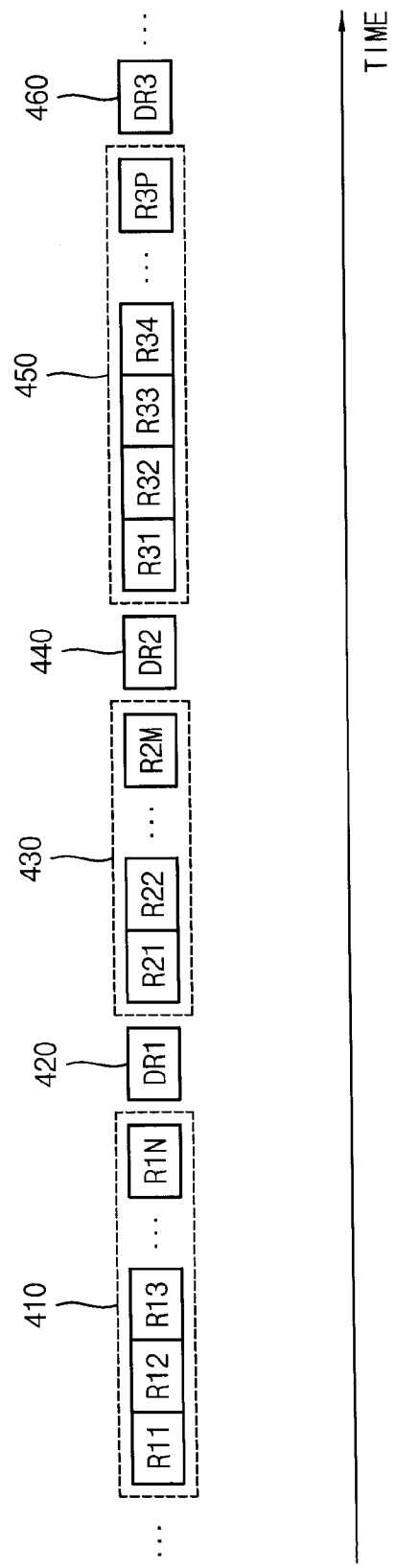
FIG. 11 is a diagram illustrating a sequence of read commands according to an example embodiment.

FIG. 11 is a diagram illustrating a sequence of read commands according to an example embodiment. Referring to FIG. 11, a sequence of read commands, which are transferred from the memory controller 120 to the non-volatile memory device 130, includes first read commands 410, second read commands 430, and third read commands 450. The sequence of the read commands includes a first reliability verification read command 420, a second reliability verification read command 440, and a third reliability verification read command 460. The sequence of the read commands may further include read commands and reliability verification read commands between the read commands.

FIG. 11 illustrates the case when a reference value of the first read commands 410 is set to N, a reference value of the second read commands 430 is set to M, and a reference value of the third read commands 450 is set to P (N, M, and P are natural numbers respectively). The memory controller 120 may generate the read commands, and determine the reference value as a random number.

In detail, when the accumulated number of the first read commands 410 reaches N, reading the data, which is stored in the sample buffer memory cells included in the first buffer memory cells, as the sample data when the accumulated number of the read commands, which are executed on the non-volatile memory device, reaches the reference value (S110) of the flow chart of FIG. 1 may be executed. In the step (S110), buffer memory cells connected to the wordline adjacent to the wordline corresponding to a frequent read command among the first read commands may be selected as the sample buffer memory cells (FIGS. 7 and 8) or buffer memory cells, which executed an erase operation, among the buffer memory cell array 141 may be selected as the same buffer memory cells (FIGS. 9 and 10). The first reliability verification read command 420 may be a command that the memory controller 120 provides to the non-volatile memory device 130 for reading a data stored in the sample buffer memory cells as the sample data.

The accumulated number may be reset after determining whether the main memory cells store the second data or the recovered first data based on the number of the errors when the number of the errors is equal to or less than the first threshold value (S130) or determining that the second buffer memory cells included in the non-volatile memory device store the recovered first data when the number of the errors is greater than the first threshold value (S140).

Then, when the accumulated number of the second read commands 430 reaches M, reading the data, which is stored in the sample buffer memory cells included in the first buffer memory cells, as the sample data when the accumulated number of the read commands, which are executed on the non-volatile memory device, reaches the reference value (S110) of the flow chart of FIG. 1 may be executed again. In the step (S110), buffer memory cells connected to the wordline adjacent to the wordline corresponding to a frequent read command among the second read commands 430 may be selected as the sample buffer memory cells (FIGS. 7 and 8) or buffer memory cells, which executed an erase operation, among the buffer memory cell array 141 may be selected as the same buffer memory cells (FIGS. 9 and 10). The second reliability verification read command 440 may be a command that the memory controller 120 provides to the non-volatile memory device 130 for reading a data stored in the sample buffer memory cells as the sample data.

The accumulated number may be reset after determining whether the main memory cells store the second data or the recovered first data based on the number of the errors when the number of the errors is equal to or less than the first threshold value (S130) or determining that the second buffer memory cells included in the non-volatile memory device store the recovered first data when the number of the errors is greater than the first threshold value (S140).

Then, when the accumulated number of the third read commands 450 reaches P, reading the data, which is stored in the sample buffer memory cells included in the first buffer memory cells, as the sample data when the accumulated number of the read commands, which are executed on the non-volatile memory device, reaches the reference value (S110) of the flow chart of FIG. 1 may be executed again. In the step (S110), buffer memory cells connected to the wordline adjacent to the wordline corresponding to a frequent read command among the third read commands 450 may be selected as the sample buffer memory cells (FIGS. 7 and 8) or buffer memory cells, which executed an erase operation, among the buffer memory cell array 141 may be selected as the same buffer memory cells (FIGS. 9 and 10). The third reliability verification read command 460 may be a command that the memory controller 120 provides to the non-volatile memory device 130 for reading a data stored in the sample buffer memory cells as the sample data.

The accumulated number may be reset after determining whether the main memory cells store the second data or the recovered first data based on the number of the errors when the number of the errors is equal to or less than the first threshold value (S130) or determining that the second buffer memory cells included in the non-volatile memory device store the recovered first data when the number of the errors is greater than the first threshold value (S140).

Figure 12:
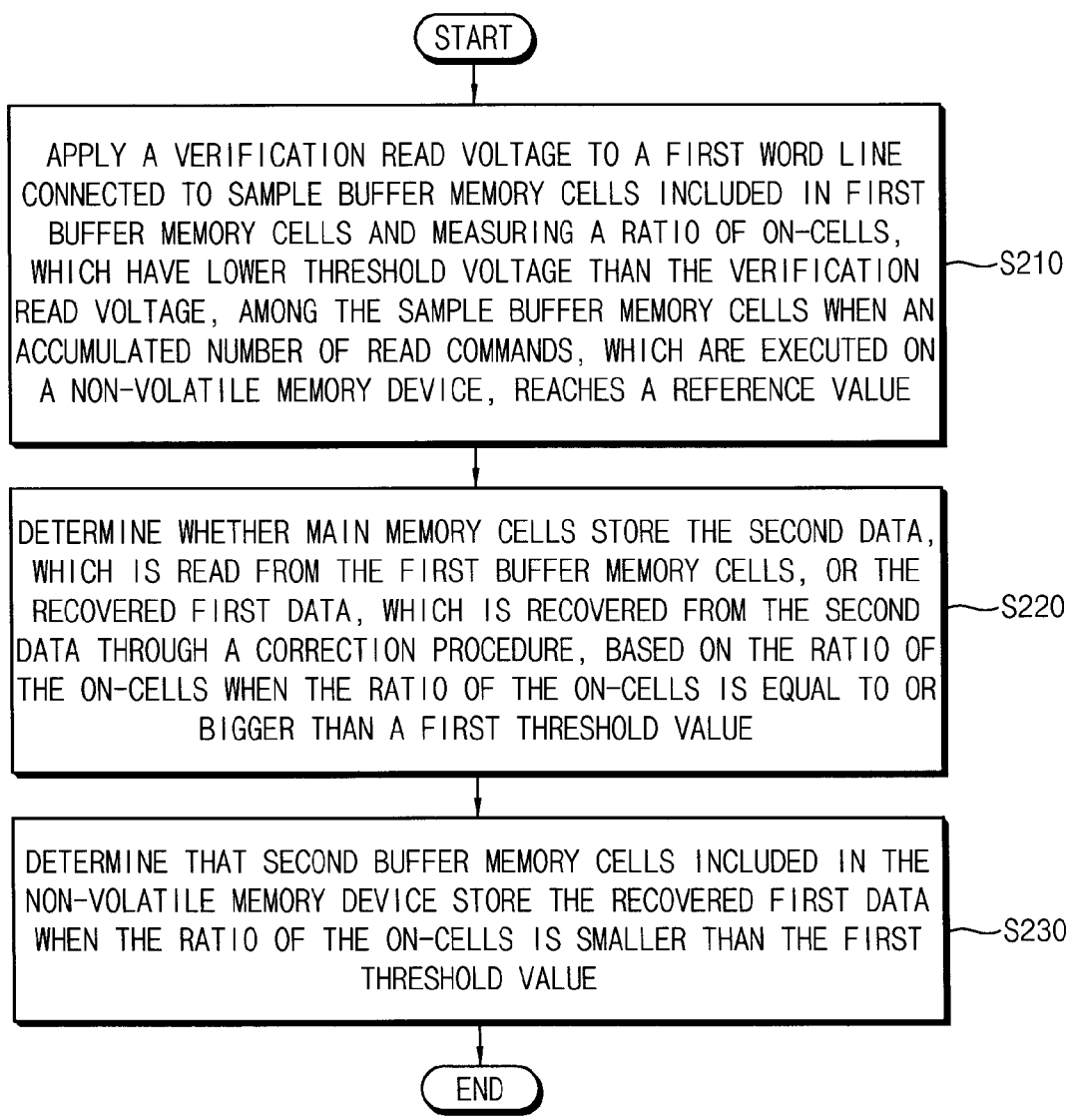
FIG. 12 is a flow chart illustrating a method of operating a non-volatile memory device according to another example embodiment.

FIG. 12 is a flow chart illustrating a method of operating a non-volatile memory device according to another example embodiment. Referring to FIG. 12, a non-volatile memory device includes a buffer memory cell array and a main memory cell array. The buffer memory cell array includes first buffer memory cells. The main memory cell array includes main memory cells.

Each of the first buffer memory cells is a single-level cell. The first buffer memory cells store a first data. The main memory cells store a second data, which is read from the first buffer memory cells, or a recovered first data, which is recovered from the second data through a correction procedure.

A method of operating the non-volatile memory device according to an example embodiment includes applying a verification read voltage to a first word line connected to sample buffer memory cells included in the first buffer memory cells and measuring a ratio of on-cells, which have lower threshold voltage than the verification read voltage, among the sample buffer memory cells when an accumulated number of read commands, which are executed on the non-volatile memory device, reaches a reference value (S210). The reliability of the sample buffer memory cells may be determined based on the ratio of the on-cells. In an example embodiment, the reliability of the sample buffer memory cells may be proportional to the ratio of the on-cells. The ratio of the on-cells will be described with reference to FIG. 14.

The method includes determining whether the main memory cells store the second data or the recovered first data based on the ratio of the on-cells when the ratio of the on-cells is equal to or greater than a first threshold value (S220). The step (S220) will be described with the reference to FIG. 13. The method may further include determining that second buffer memory cells included in the non-volatile memory device store the recovered first data when the ratio of the on-cells is less than the first threshold value (S230). In this case the sample buffer memory cells are determined to be unreliable because the read disturbance is large. Therefore, the data stored in the first buffer memory cells should be recovered through the correction procedure, and the recovered data should be stored in the second buffer memory cells, and the first buffer memory cells may be disabled.

The memory controller 120 may generate the read commands, and determine the reference value as a random number.

Applying the verification read voltage to the first word line connected to the sample buffer memory cells included in the first buffer memory cells and measuring the ratio of the on-cells, which have lower threshold voltage than the verification read voltage, among the sample buffer memory cells when the accumulated number of the read commands, which are executed on the non-volatile memory device, reaches the reference value (S210) may correspond to the steps (S110 and S120) included in the flow chart of FIG. 1.

In an example embodiment, a first wordline connected to the sample buffer memory cells may be adjacent to a second wordline corresponding to a frequent read command among the read commands.

In an example embodiment, the sample buffer memory cells may execute an erase operation before applying the verification read voltage to the first word line connected to the sample buffer memory cells included in the first buffer memory cells and measuring the ratio of the on-cells, which have lower threshold voltage than the verification read voltage, among the sample buffer memory cells when the accumulated number of the read commands, which are executed on the non-volatile memory device, reaches the reference value (S210).

FIG. 13 is a flow chart illustrating a determination of whether the main memory cells store the second data or the recovered first data based on the ratio of the on-cells when the ratio of the on-cells is equal to or bigger than the first threshold value of the flow chart of FIG. 12.

Referring to FIG. 13, determining whether the main memory cells store the second data or the recovered first data based on the ratio of the on-cells when the ratio of the on-cells is equal to or greater than the first threshold value (S220) may include determining that the main memory cells store the recovered first data when the ratio of the on-cells is less than a second threshold value (S221) and determining that the main memory cells store the second data when the ratio of the on-cells is equal to or less than the second threshold value (S222).

In a case when the ratio of the on-cells is equal to or greater than the first threshold value and the ratio of the on-cells is less than the second threshold value (S221), the sample buffer memory cells are determined to be reliable after error correction because the read disturbance is small. In this case, while the data stored in the first buffer memory cells is transferred to the main memory cells in the on-chip buffered programming (OBP) method, the error correction performed to the second data, which is read from the first buffer memory cells, and the recovered first data, which is recovered from the second data, is stored to the main memory cells.

In a case when the ratio of the on-cells is equal to or greater than the second threshold value (S222), the sample buffer memory cells are determined to be reliable because the read disturbance is small. In this case, while the data stored in the first buffer memory cells is transferred to the main memory cells in OBP method, the second data, which is read from the first buffer memory cells, is stored to the main memory cells.

Referring to FIG. 6, when the ratio of the on-cells is equal to or greater than the first threshold value and the ratio of the on-cells is less than a second threshold value, the main memory cells store the recovered first data (S221). In this case, errors of the page data loaded to the page buffer 170 may be corrected through the error corrector ECC included in the memory controller 120 of FIG. 3 after executing the loading operations PTA, PTB, and PTC of the on-chip buffered programming (OBP). Then, the corrected page data may be loaded PTD to the main memory cells included in the main memory cell array 142.

When the ratio of the on-cells is equal to or greater than the second threshold value, the main memory cells store the second data (S222). In this case, the page data loaded to the page buffer 170 may be loaded PTD to the main memory cells included in the main memory cell array 142 after executing the loading operations PTA, PTB, and PTC of the on-chip buffered programming (OBP).

Figure 14:
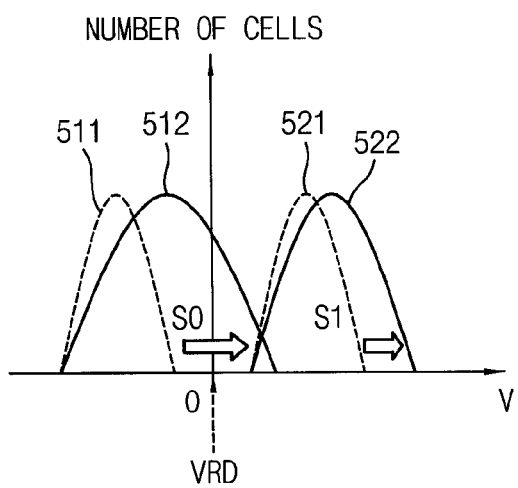
FIG. 14 is a graph illustrating the ratio of the on-cells of the flow chart of FIG. 12.

FIG. 14 is a graph illustrating the ratio of the on-cells of the flow chart of FIG. 12. Referring to FIG. 14, the buffer memory cell array 141 of the memory system 100 of FIG. 3 may include first buffer memory cells. Each of the first buffer memory cells may have a first logic state corresponding to logic value 0 or a second logic state corresponding to logic value 1. In general, logic value 0 and logic value 1 may be equally used in the buffer memory cell array 141.

The first buffer memory cells may have first threshold voltage distributions 511, 521 corresponding to the first and second logic states when the read disturbance does not happen on the first buffer memory cells. The first buffer memory cells may have second threshold voltage distributions 512, 522 when the read disturbance happens on the first buffer memory cells. The second threshold voltage distributions 512, 522 are spread widely and shifted to the right compared to the first threshold voltage distributions 511, 521. The verification read voltage VRD may be between the threshold voltage distribution 511 corresponding to the first logic state and the threshold voltage distribution 521 corresponding to the second logic state.

When the first buffer memory cells have the first threshold voltage distributions 511, 521 because the read disturbance does not happen on the first buffer memory cells and the verification read voltage VRD is applied to the first buffer memory cells, the ratio of the on-cells, which have a lower threshold than the verification read voltage VRD, among the first buffer memory cells is ½ stochastically. When the first buffer memory cells have the second threshold voltage distributions 512, 522 because the read disturbance happens on the first buffer memory cells and the verification read voltage VRD is applied to the first buffer memory cells, the ratio of the on-cells among the first buffer memory cells is lower than ½ stochastically. When the ratio of the on-cells is close to ½, the first buffer memory cells may be determined to be reliable. When the ratio of the on-cells is far lower than ½, the first buffer memory cells may be determined to be unreliable.

Figure 15:
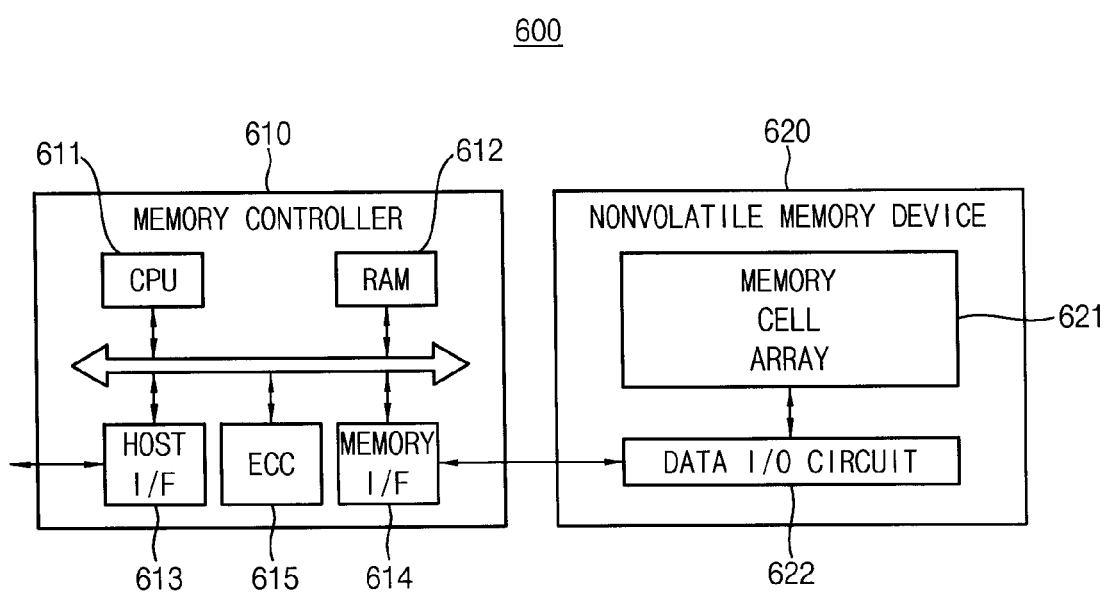
FIG. 15 is a block diagram illustrating a memory system according to example embodiments.

FIG. 15 is a block diagram illustrating a memory system according to example embodiments. Referring to FIG. 15, a memory system 600 includes a memory controller 610 and a non-volatile memory device 620. The non-volatile memory device 620 includes a memory cell array 621 and a data I/O circuit 622. The memory cell array 621 is formed on a substrate in a three-dimensional structure. The three-dimensional structure of the memory cell array 621 may be understood based on the references to FIGS. 4 and 5.

The data I/O circuit 622 is connected to the memory cell array 621 through the plurality of bit lines. The data I/O circuit 622 may select at least one of the plurality of bit lines, output data read from a memory cell connected to the selected at least one bit line to the memory controller 610, and write data received from the memory controller 610 in a memory cell connected to the selected at least one bit line.

The non-volatile memory device 620, the memory cell array 621, and the data I/O circuit 622 may corresponds to the non-volatile memory device 130, the memory cell array 140, and the data input/output circuit 170 included in the memory system 100 of FIG. 3, respectively. The non-volatile memory device 620, the memory cell array 621, and the data I/O circuit 622 may be understood based on the reference to FIG. 3.

The memory controller 610 may control the non-volatile memory device 620. The memory controller 610 may control data transfer between an external host and the non-volatile memory device 620. The memory controller 610 may include a central processing unit 611, a buffer memory 612, a host interface 613 and a memory interface 614.

The central processing unit 611 may perform operations for the data transfer. The buffer memory 612 may be implemented by a dynamic random access memory (DRAM), a static random access memory (SRAM), a phase change random access memory (PRAM), a ferroelectric random access memory (FRAM), a resistance random access memory (RRAM), a magnetic random access memory (MRAM), etc.

The buffer memory 612 may be an operational memory of the central processing unit 611. In some example embodiments, the buffer memory 612 may be included in the memory controller 610. In other example embodiments, the buffer memory 612 may be outside of the memory controller 610. The buffer memory 612 may correspond to the buffer memory BUFFER included in the memory system 100 of FIG. 3.

The host interface 613 may be coupled to the host, and the memory interface 614 may be coupled to the non-volatile memory device 620. The central processing unit 611 may communicate with the host via the host interface 613. For example, the host interface 613 may be configured to communicate with the host using at least one of various interface protocols, such as a universal serial bus (USB), a multimedia card (MMC), a peripheral component interconnect-express (PCI-E), a small computer system interface (SCSI), a serial-attached SCSI (SAS), a serial advanced technology attachment (SATA), a parallel advanced technology attachment (PATA), an enhanced small disk interface (ESDI), integrated drive electronics (IDE), and so on.

Further, the central processing unit 611 may communicate with the non-volatile memory device 620 via the memory interface 614.

In some example embodiments, the memory controller 610 may further include an error correction block 615 for error correction. The error correction block 615 may correspond to the error corrector ECC included in the memory system 100 of FIG. 3.

In some example embodiments, the memory controller 610 may be built in the non-volatile memory device 620, or the memory controller 610 and the non-volatile memory device 620 may be implemented as separate chips.

Figure 16:
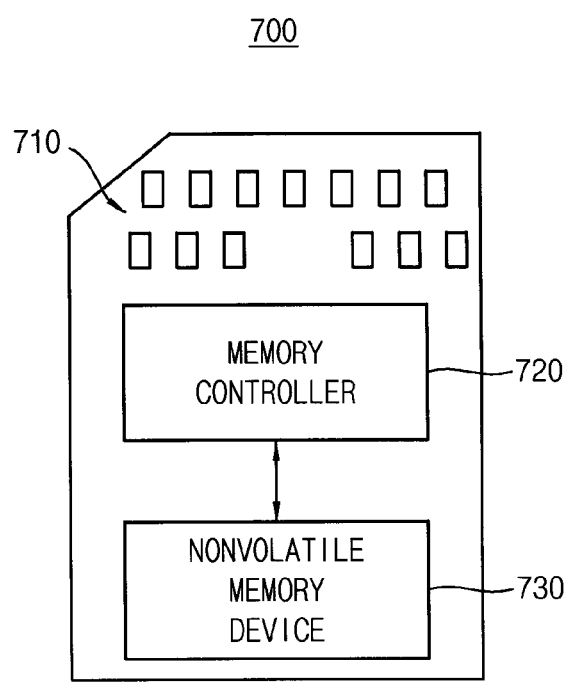
FIG. 16 is a block diagram illustrating a memory card according to example embodiments.

The memory system 600 may be implemented as a memory card, a solid state drive, and so on. FIG. 16 is a block diagram illustrating a memory card according to example embodiments. Referring to FIG. 16, a memory card 700 includes a plurality of connecting pins 710, a memory controller 720 and a non-volatile memory device 730.

The connecting pins 710 may be coupled to an external host to transfer signals between the host and the memory card 700. The connecting pins 710 may include a clock pin, a command pin, a data pin and/or a reset pin. The memory controller 720 may receive data from the host, and may store the received data in the non-volatile memory device 730.

The non-volatile memory device 730 may include a memory cell array formed on a substrate in a three-dimensional structure. Memory cells included in the memory cell array may be formed in a direction perpendicular to the substrate. The memory cells included in the memory cell array may be connected to a plurality of word lines, which are stacked in a direction perpendicular to the substrate, and a plurality of bit lines, which are formed in a direction parallel to the substrate.

The non-volatile memory device 730 may correspond to the non-volatile memory device 130 included in the memory system 100 of FIG. 3. The non-volatile memory device 730 may be understood based on the reference to FIG. 3.

The memory card 700 may include a MMC, an embedded MMC (eMMC), a hybrid embedded MMC (hybrid eMMC), a secure digital (SD) card, a micro-SD card, a memory stick, an ID card, a personal computer memory card international association (PCMCIA) card, a chip card, a USB card, a smart card, a compact flash (CF) card, and so on.

In some example embodiments, the memory card 700 may be coupled to the host, such as a desktop computer, a laptop computer, a tablet computer, a mobile phone, a smart phone, a music player, a personal digital assistants (PDA), a portable multimedia player (PMP), a digital television, a digital camera, a portable game console, and so on.

Figure 17:
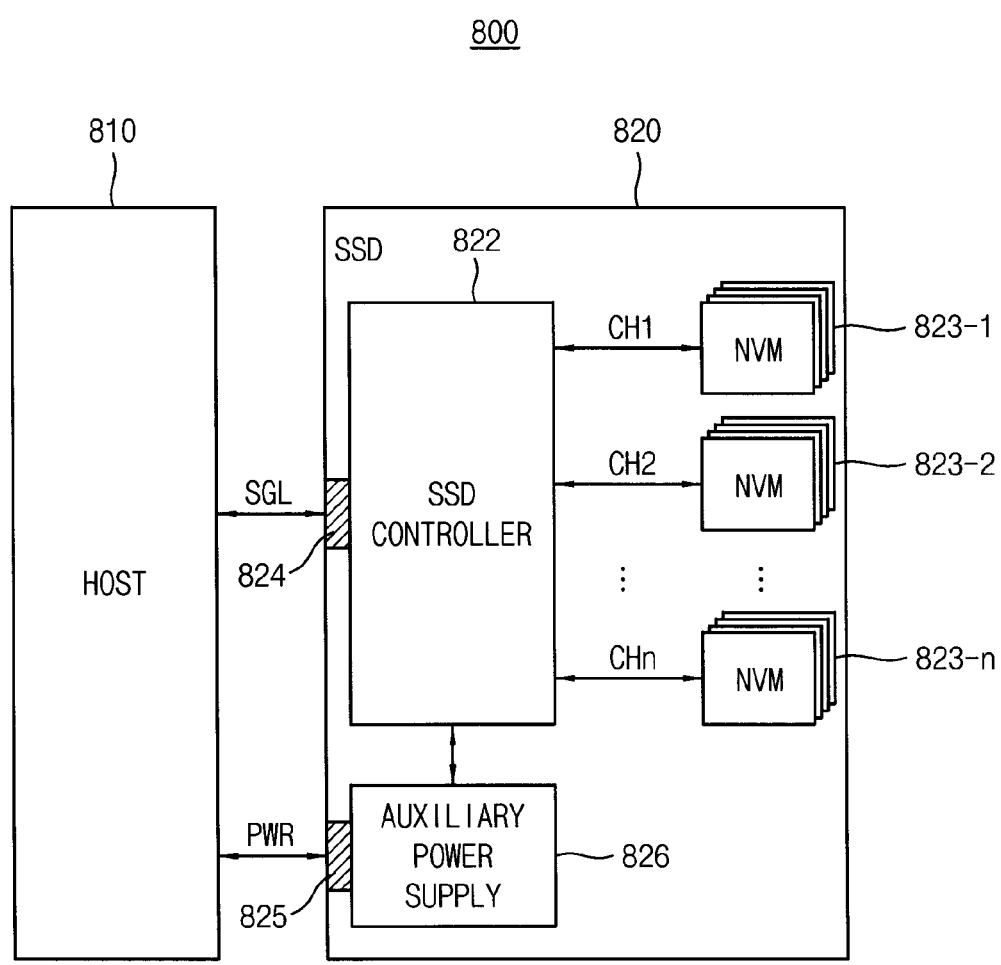
FIG. 17 is a block diagram illustrating a solid state drive system according to example embodiments.

FIG. 17 is a block diagram illustrating a solid state drive system according to example embodiments. Referring to FIG. 17, an SSD system 800 includes a host 810 and an SSD 820. The SSD 820 includes first through n-th non-volatile memory devices 823-1, 823-2, . . . , 823-*n* and a SSD controller 822. Here, n represents an integer greater than or equal to two. The first through n-th non-volatile memory devices 823-1, 823-2, . . . , 823-n may be used as a storage medium of the SSD 820.

Each of the first through n-th non-volatile memory devices 823-1, 823-2, . . . , 823-n may include a memory cell array formed on a substrate in a three-dimensional structure. Memory cells included in the memory cell array may be formed in a direction perpendicular to the substrate. The memory cells included in the memory cell array may be connected to a plurality of word lines, which are stacked in a direction perpendicular to the substrate, and a plurality of bit lines, which are formed in a direction parallel to the substrate.

Each of the first through n-th non-volatile memory devices 823-1, 823-2, . . . , 823-n may be implemented with the non-volatile memory device 130 included in the memory system 100 of FIG. 3. The first through n-th non-volatile memory devices 823-1, 823-2, . . . , 823-n may be understood based on the reference to FIG. 3. The SSD controller 822 is coupled to the first through n-th non-volatile memory devices 823-1, 823-2, . . . , 823-n by first through n-th channels CH1, CH2, . . . , CHn, respectively.

The SSD controller 822 may exchange a signal SGL with the host 810 through a signal connector 824. The signal SGL may include a command, an address and data. The SSD controller 822 may perform a program operation and a read operation on the first through n-th non-volatile memory devices 823-1, 823-2, . . . , 823-n according to the command received from the host 810.

The SSD 820 may further include an auxiliary power supply 826. The auxiliary power supply 826 may receive power PWR from the host 810 through a power connector 825 and provide power to the SSD controller 822. The auxiliary power supply 826 may be placed inside or outside the SSD 820. For example, the auxiliary power supply 826 may be placed in a main board and provide auxiliary power to the SSD 820.

Figure 18:
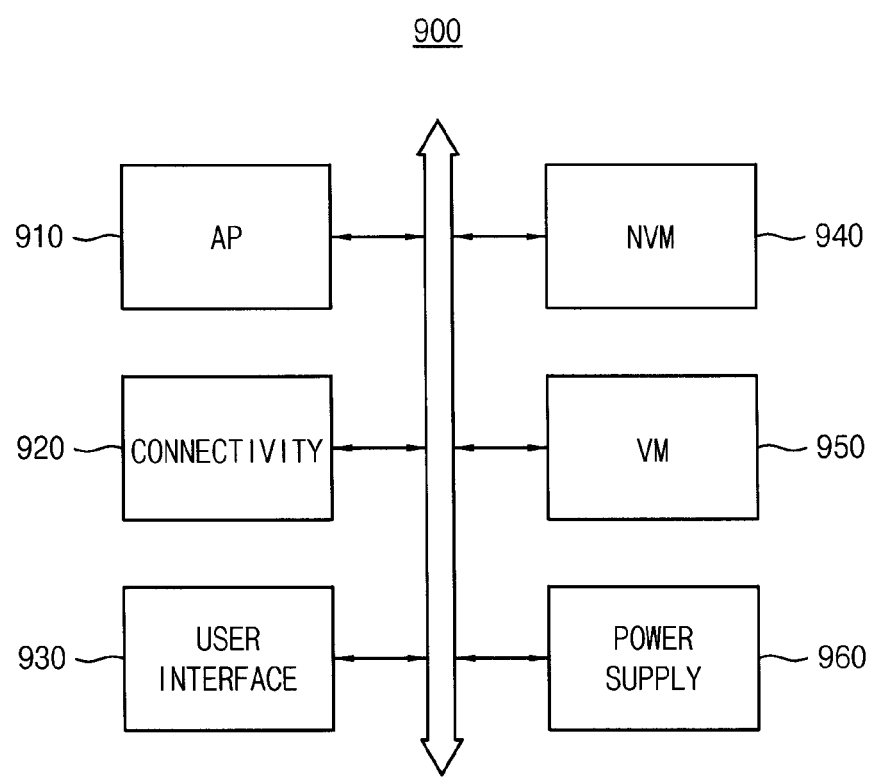
FIG. 18 is a block diagram illustrating a mobile system according to example embodiments.

FIG. 18 is a block diagram illustrating a mobile system according to example embodiments. Referring to FIG. 18, a mobile system 900 includes an application processor AP 910, a connectivity unit 920, a user interface 930, a non-volatile memory device NVM 940, a volatile memory device VM 950 and a power supply 960.

In some embodiments, the mobile system 900 may be a mobile phone, a smart phone, a personal digital assistant (PDA), a portable multimedia player (PMP), a digital camera, a music player, a portable game console, a navigation system, etc.

The application processor 910 may execute applications, such as a web browser, a game application, a video player, etc. In some example embodiments, the application processor 910 may include a single core or multiple cores. For example, the application processor 910 may be a multi-core processor, such as a dual-core processor, a quad-core processor, a hexa-core processor, etc. The application processor 910 may include an internal or external cache memory.

The connectivity unit 920 may perform wired or wireless communication with an external device. For example, the connectivity unit 920 may perform Ethernet communication, near field communication (NFC), radio frequency identification (RFID) communication, mobile telecommunication, memory card communication, universal serial bus (USB) communication, etc. In some embodiments, the connectivity unit 920 may include a baseband chipset that supports communications, such as global system for mobile communications (GSM), general packet radio service (GPRS), wideband code division multiple access (WCDMA), high speed downlink/uplink packet access (HSxPA), etc.

The non-volatile memory device 910 may store a boot image for booting the mobile system 900.

The non-volatile memory device 940 may include a memory cell array formed on a substrate in a three-dimensional structure. Memory cells included in the memory cell array may be formed in a direction perpendicular to the substrate. The memory cells included in the memory cell array may be connected to a plurality of word lines, which are stacked in a direction perpendicular to the substrate, and a plurality of bit lines, which are formed in a direction parallel to the substrate.

The non-volatile memory device 940 may be implemented as the non-volatile memory device 130 included in the memory system 100 of FIG. 3. The non-volatile memory device 940 may be understood based on the reference to FIG. 3.

The volatile memory device 950 may store data processed by the application processor 910, or may operate as a working memory.

The user interface 930 may include at least one input device, such as a keypad, a touch screen, etc., and at least one output device, such as a speaker, a display device, etc.

The power supply 960 may supply a power supply voltage to the mobile system 900.

In some embodiments, the mobile system 900 may further include an image processor, and/or a storage device, such as a memory card, a solid state drive (SSD), a hard disk drive (HDD), a CD-ROM, etc.

In some embodiments, the mobile system 900 and/or components of the mobile system 900 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of operating a non-volatile memory device including first buffer memory cells and main memory cells, the first buffer memory cells storing a first data, the main memory cells storing a second data, which is read from the first buffer memory cells, or a recovered first data, which is recovered from the second data through a correction process, the method comprising:

reading data, which is stored in sample buffer memory cells included in the first buffer memory cells, as sample data when an accumulated number of read commands, which are executed on the non-volatile memory device, reaches a reference value;

counting a number of errors included in the sample data based on an error correction code; and determining whether the main memory cells store the second data or the recovered first data based on the number of the errors relative to a first threshold value.

2. The method of claim 1 further comprising determining that second buffer memory cells included in the non-volatile memory device store the recovered first data when the number of the errors is greater than the first threshold value, wherein the non-volatile memory device includes a three-dimensional memory array having the first buffer memory cells, the second buffer memory cells, and the main memory cells, wherein word-lines and/or bit-lines are shared between levels in the three-dimensional memory array.

3. The method of claim 2, wherein a memory controller generates the read commands, and determines the reference value as a random number.

4. The method of claim 3, wherein the accumulated number is reset after determining whether the main memory cells store the second data or the recovered first data based on the number of the errors relative to the first threshold value.

5. The method of claim 3, wherein the accumulated number is reset after determining that the second buffer memory cells included in the non-volatile memory device store the recovered first data when the number of the errors is greater than the first threshold value.

6. The method of claim 1, wherein a first wordline connected to the sample buffer memory cells is adjacent to a second wordline corresponding to a frequent read command among the read commands.

7. The method of claim 1, wherein the sample buffer memory cells execute an erase operation before reading the data, which is stored in the sample buffer memory cells included in the first buffer memory cells, as the sample data when the accumulated number of the read commands, which are executed on the non-volatile memory device, reaches the reference value.

8. The method of claim 1, wherein determining whether the main memory cells store the second data or the recovered first data based on the number of the errors relative to the first threshold value includes determining that the main memory cells store the recovered first data when the number of the errors is greater than a second threshold value.

9. The method of claim 8, wherein determining whether the main memory cells store the second data or the recovered first data based on the number of the errors relative to the first threshold value further includes determining that the main memory cells store the second data when the number of the errors is equal to or less than the second threshold value.

10. The method of claim 1, wherein each of the first buffer memory cells is a single-level cell storing a data bit, and each of the main memory cells is a multi-level cell storing two data bits.

11. The method of claim 1, wherein each of the first buffer memory cells is a single-level cell storing a data bit, and each of the main memory cells is a triple-level cell storing three data bits.

12. The method of claim 1, wherein a memory controller generates the recovered first data from the second data based on the error correction code.

13. A method of operating a non-volatile memory device including first buffer memory cells and main memory cells, each of the first buffer memory cells being a single-level cell, the first buffer memory cells storing a first data, the main memory cells storing a second data, which is read from the first buffer memory cells, or a recovered first data, which is recovered from the second data through a correction process, the method comprising:

applying a verification read voltage to a first word line connected to sample buffer memory cells included in the first buffer memory cells and measuring a ratio of on-cells, which have a lower threshold voltage than the verification read voltage, among the sample buffer memory cells when an accumulated number of read commands, which are executed on the non-volatile memory device, reaches a reference value; and determining whether the main memory cells store the second data or the recovered first data based on the ratio of the on-cells relative to a first threshold value.

14. The method of claim 13 further comprising determining that second buffer memory cells included in the non-volatile memory device store the recovered first data when the ratio of the on-cells is less than the first threshold value, wherein the non-volatile memory device includes a three-dimensional memory array having the first buffer memory cells, the second buffer memory cells, and the main memory cells, wherein word-lines and/or bit-lines are shared between levels in the three-dimensional memory array.

15. The method of claim 13, wherein each of the first buffer memory cells has one of a first logic state corresponding to logical value 0 and a second logic state corresponding to logical value 1; wherein the verification read voltage is between a first threshold voltage distribution corresponding to the first logic state and a second threshold voltage distribution corresponding to the second logic state.

16. The method of claim 13, wherein a memory controller generates the read commands, and determines the reference value as a random value.

17. The method of claim 13, wherein a first wordline connected to the sample buffer memory cells is adjacent to a second wordline corresponding to a frequent read command among the read commands.

18. The method of claim 13, wherein the sample buffer memory cells execute an erase operation before applying the verification read voltage to the first word line connected to the sample buffer memory cells included in the first buffer memory cells and measuring the ratio of the on-cells, which have a lower threshold voltage than the verification read voltage, among the sample buffer memory cells when the accumulated number of the read commands, which are executed on the non-volatile memory device, reaches the reference value.

19. The method of claim 13, wherein determining whether the main memory cells store the second data or the recovered first data based on the ratio of the on-cells relative to the first threshold value includes: determining that the main memory cells store the recovered first data when the ratio of the on-cells is less than a second threshold value.

20. The method of claim 19, wherein determining whether the main memory cells store the second data or the recovered first data based on the ratio of the on-cells relative to the first threshold value further includes: determining that the main memory cells store the second data when the ratio of the on-cells is equal to or greater than the second threshold value.

* * * * *